United States Patent [19]

Valfells et al.

[11] 4,007,392
[45] Feb. 8, 1977

[54] MAGNETIC WELL FOR PLASMA CONFINEMENT

[75] Inventors: August Valfells, Ames, Iowa; Ya-Chang Chiu, Madison, Wis.

[73] Assignee: Iowa State University Research Foundation, Inc., Ames, Iowa

[22] Filed: Apr. 16, 1974

[21] Appl. No.: 461,345

[52] U.S. Cl. .............................. 313/154; 313/162; 313/231.3; 176/3; 335/219

[51] Int. Cl.² ...................... H01J 1/50; G21B 1/00

[58] Field of Search ............... 313/162, 154, 231.3; 335/213, 210, 209, 219; 176/1, 2, 3

[56] References Cited

UNITED STATES PATENTS

| | | | |
|---|---|---|---|
| 3,614,525 | 10/1971 | Uleski | 313/154 X |
| 3,643,123 | 2/1972 | Haeff | 313/162 |

Primary Examiner—R. V. Rolinec
Assistant Examiner—Darwin R. Hostetter
Attorney, Agent, or Firm—Tilton, Fallon, Lungmus, Chestnut & Hill

[57] ABSTRACT

A multipole magnetic well for plasma confinement includes a plurality of current-carrying coils placed on planes corresponding to the facets of a regular polyhedron that can be symmetrically circumscribed about a sphere. The direction of current in the coils is such as to minimize the flux density at the center of the polyhedron, thereby providing a confinement well with three-dimensional symmetry having an increasing flux density in all directions from the center.

16 Claims, 18 Drawing Figures

```
HALFX2=GX(X2,Y2,T2,A+HOV2)
HALFX3=GX(X3,Y3,T3,A+HCV2)
HALFX4=GX(X4,Y4,T4,A+HOV2)
HALFY1=GY(X1,Y1,T1,A+HOV2)
HALFY2=GY(X2,Y2,T2,A+HOV2)
HALFY3=GY(X3,Y3,T3,A+HOV2)
HALFY4=GY(X4,Y4,T4,A+HOV2)
HALFZ1=GZ(X1,Y1,T1,A+HCV2)
HALFZ2=GZ(X2,Y2,T2,A+HOV2)
HALFZ3=GZ(X3,Y3,T3,A+HCV2)
HALFZ4=GZ(X4,Y4,T4,A+HOV2)
HALX1P=GX(X ,Y ,T1P,A+HOV2)
HALX2P=GX(X2,Y2,T2P,A+HOV2)
HALX3P=GX(X3,Y3,T3P,A+HOV2)
HALX4P=GX(X4,Y4,T4P,A+HCV2)
HALY1P=GY(X1,Y1,T1P,A+HOV2)
HALY2P=GY(X2,Y2,T2P,A+HOV2)
HALY3P=GY(X3,Y3,T3P,A+HOV2)
HALY4P=GY(X4,Y4,T4P,A+HOV2)
HALZ1P=GZ(X1,Y1,T1P,A+HCV2)
HALZ2P=GZ(X2,Y2,T2P,A+HOV2)
HALZ3P=GZ(X3,Y3,T3P,A+HOV2)
HALZ4P=GZ(X4,Y4,T4P,A+HOV2)
NM1=N-1
DO 2 K=1,NM1
D=A+FLOAT(K)*H
SX1=SX1+GX(X ,Y ,T1 ,D)
SX2=SX2+GX(X2,Y2,T2 ,D)
SX3=SX3+GX(X3,Y3,T3 ,D)
SX4=SX4+GX(X4,Y4,T4 ,D)
SY1=SY1+GY(X1,Y1,T1 ,D)
SY2=SY2+GY(X2,Y2,T2 ,D)
SY3=SY3+GY(X3,Y3,T3 ,D)
SY4=SY4+GY(X4,Y4,T4 ,D)
SZ1=SZ1+GZ(X1,Y1,T1 ,D)
SZ2=SZ2+GZ(X2,Y2,T2 ,D)
SZ3=SZ3+GZ(X3,Y3,T3 ,D)
SZ4=SZ4+GZ(X4,Y4,T4 ,D)
SX1P=SX1P+GX(X ,Y ,T1P,D)
SX2P=SX2P+GX(X2,Y2,T2P,D)
SX3P=SX3P+GX(X3,Y3,T3P,D)
SY1P=SY1P+GY(X1,Y1,T1P,D)
SY2P=SY2P+GY(X2,Y2,T2P,D)
SY3P=SY3P+GY(X3,Y3,T3P,D)
SY4P=SY4P+GY(X4,Y4,T4P,D)
SZ1P=SZ1P+GZ(X1,Y1,T1P,D)
SZ2P=SZ2P+GZ(X2,Y2,T2P,D)
SZ3P=SZ3P+GZ(X3,Y3,T3P,D)
SZ4P=SZ4P+GZ(X4,Y4,T4P,D)
HALFX1=HALFX1+GX(X ,Y ,T1 ,D+HCV2)
HALFX2=HALFX2+GX(X2,Y2,T2 ,D+HOV2)
HALFX3=HALFX3+GX(X3,Y3,T3 ,D+HOV2)
HALFX4=HALFX4+GX(X4,Y4,T4 ,D+HOV2)
HALFY1=HALFY1+GY(X1,Y1,T1 ,D+HOV2)
HALFY2=HALFY2+GY(X2,Y2,T2 ,D+HCV2)
HALFY3=HALFY3+GY(X3,Y3,T3 ,D+HOV2)
HALFY4=HALFY4+GY(X4,Y4,T4 ,D+HOV2)
HALFZ1=HALFZ1+GZ(X1,Y1,T1 ,D+HOV2)
HALFZ2=HALFZ2+GZ(X2,Y2,T2 ,D+HOV2)
HALFZ3=HALFZ3+GZ(X3,Y3,T3 ,D+HOV2)
HALFZ4=HALFZ4+GZ(X4,Y4,T4 ,D+HOV2)
HALX1P=HALX1P+GX(X1,Y1,T1P,D+HOV2)
HALX2P=HALX2P+GX(X2,Y2,T2P,D+HCV2)
HALX3P=HALX3P+GX(X3,Y3,T3P,D+HOV2)
HALX4P=HALX4P+GX(X4,Y4,T4P,D+HOV2)
HALY1P=HALY1P+GY(X1,Y1,T1P,D+HOV2)
HALY2P=HALY2P+GY(X2,Y2,T2P,D+HGV2)
```

FIG. 11 A

```
CALCULATION OF THE MAGNETIC FIELD WITH TETRAHEDRAL SYMMETRY
GX(X,Y,Z,W)=Z*COS(3.1416*W)*R/((X-R*COS(3.1416*W))*(X-R*COS(3.1416
1*W))+(Y+R*SIN(3.1416*W))*(Y+R*SIN(3.1416*W))+Z*Z)**1.5
GY(X,Y,Z,W)=-Z*SIN(3.1416*W)*R/((X-R*COS(3.1416*W))*(X-R*COS(3.141
16*W))+(Y+R*SIN(3.1416*W))*(Y+R*SIN(3.1416*W))+Z*Z)**1.5
GZ(X,Y,Z,W)=(Y*SIN(3.1416*W)-X*COS(3.1416*W)+R)*R/((X-R*COS
1(3.1416*W))*(X-R*COS(3.1416*W))+(Y+R*SIN(3.1416*W))*(Y+R*SIN(
23.1416*W))+Z*Z)**1.5
R=0.053
C=0.707*R
Y=0.
DO 30 I=1,21
DO 30 J=1,21
DO 30 K=1,21
NM1=I-1
NM2=J-1
NM3=K-1
X=-0.065+0.0065*FLOAT(NM1)
Z=-0.065+0.0065*FLOAT(NM2)
Y=-0.065+0.0065*FLOAT(NM3)
X2=X
Y2=-0.333333*Y-0.9428303*Z
Z2=0.9428303*Y-0.3333333*Z
X3=-0.5*X-0.8660255*Y
Y3=-0.28867517*X+0.16666667*Y-0.9428303*Z
Z3=0.816515*X-0.47141515*Y-0.333333*Z
X4=-0.5*X+0.8660255*Y
Y4=0.28867517*X+0.1666667*Y-0.9428303*Z
Z4=-0.816515*X-0.47141515*Y-0.333333*Z
T1=Z-C
T1P=Z+C
T2=Z2-C
T2P=Z2+C
T3=Z3-C
T3P=Z3+C
T4=Z4-C
T4P=Z4+C
X1=X
Y1=Y
N=15
A=0.
B=6.2832
H=(B-A)/FLOAT(N)
SX1=0.
SX2=0.
SX3=0.
SX4=0.
SY1=0.
SY2=0.
SY3=0.
SY4=0.
SZ1=0.
SZ2=0.
SZ3=0.
SZ4=0.
SX1P=0.
SX2P=0.
SX3P=0.
SX4P=0.
SY1P=0.
SY2P=0.
SY3P=0.
SY4P=0.
SZ1P=0.
SZ2P=0.
SZ3P=0.
SZ4P=0.
HOV2=H/2.
HALFX1=GX(X ,Y ,T1,A+HOV2)
```

```
       HALY3P=HALY3P+GY(X3,Y3,T3P,D+HOV2)
       HALY4P=HALY4P+GY(X4,Y4,T4P,D+HCV2)
       HALZ1P=HALZ1P+GZ(X1,Y1,T1P,D+HOV2)
       HALZ2P=HALZ2P+GZ(X2,Y2,T2P,D+HCV2)
       HALZ3P=HALZ3P+GZ(X3,Y3,T3P,D+HCV2)
       HALZ4P=HALZ4P+GZ(X4,Y4,T4P,D+HOV2)
       SX1  =(H/6.)*(GX(X ,Y ,T1 ,A)+4.*HALFX1+2.*SX1 +GX(X ,Y ,T1 ,B))
       SX2  =(H/6.)*(GX(X2,Y2,T2 ,A)+4.*HALFX2+2.*SX2 +GX(X2,Y2,T2 ,B))
       SX3  =(H/6.)*(GX(X3,Y3,T3 ,A)+4.*HALFX3+2.*SX3 +GX(X3,Y3,T3 ,B))
       SX4  =(H/6.)*(GX(X4,Y4,T4 ,A)+4.*HALFX4+2.*SX4 +GX(X4,Y4,T4 ,B))
       SY1  =(H/6.)*(GY(X1,Y1,T1 ,A)+4.*HALFY1+2.*SY1 +GY(X1,Y1,T1 ,B))
       SY2  =(H/6.)*(GY(X2,Y2,T2 ,A)+4.*HALFY2+2.*SY2 +GY(X2,Y2,T2 ,B))
       SY3  =(H/6.)*(GY(X3,Y3,T3 ,A)+4.*HALFY3+2.*SY3 +GY(X3,Y3,T3 ,B))
       SY4  =(H/6.)*(GY(X4,Y4,T4 ,A)+4.*HALFY4+2.*SY4 +GY(X4,Y4,T4 ,B))
       SZ1  =(H/6.)*(GZ(X1,Y1,T1 ,A)+4.*HALFZ1+2.*SZ1 +GZ(X1,Y1,T1 ,B))
       SZ2  =(H/6.)*(GZ(X2,Y2,T2 ,A)+4.*HALFZ2+2.*SZ2 +GZ(X2,Y2,T2 ,B))
       SZ3  =(H/6.)*(GZ(X3,Y3,T3 ,A)+4.*HALFZ3+2.*SZ3 +GZ(X3,Y3,T3 ,B))
       SZ4  =(H/6.)*(GZ(X4,Y4,T4 ,A)+4.*HALFZ4+2.*SZ4 +GZ(X4,Y4,T4 ,B))
       SX1P=(H/6.)*(GX(X1,Y1,T1P,A)+4.*HALX1P+2.*SX1P+GX(X1,Y1,T1P,B))
       SX2P=(H/6.)*(GX(X2,Y2,T2P,A)+4.*HALX2P+2.*SX2P+GX(X2,Y2,T2P,B))
       SX3P=(H/6.)*(GX(X3,Y3,T3P,A)+4.*HALX3P+2.*SX3P+GX(X3,Y3,T3P,B))
       SX4P=(H/6.)*(GX(X4,Y4,T4P,A)+4.*HALX4P+2.*SX4P+GX(X4,Y4,T4P,B))
       SY1P=(H/6.)*(GY(X1,Y1,T1P,A)+4.*HALY1P+2.*SY1P+GY(X1,Y1,T1P,B))
       SY2P=(H/6.)*(GY(X2,Y2,T2P,A)+4.*HALY2P+2.*SY2P+GY(X2,Y2,T2P,B))
       SY3P=(H/6.)*(GY(X3,Y3,T3P,A)+4.*HALY3P+2.*SY3P+GY(X3,Y3,T3P,B))
       SY4P=(H/6.)*(GY(X4,Y4,T4P,A)+4.*HALY4P+2.*SY4P+GY(X4,Y4,T4P,B))
       SZ1P=(H/6.)*(GZ(X1,Y1,T1P,A)+4.*HALZ1P+2.*SZ1P+GZ(X1,Y1,T1P,B))
       SZ2P=(H/6.)*(GZ(X2,Y2,T2P,A)+4.*HALZ2P+2.*SZ2P+GZ(X2,Y2,T2P,B))
       SZ3P=(H/6.)*(GZ(X3,Y3,T3P,A)+4.*HALZ3P+2.*SZ3P+GZ(X3,Y3,T3P,B))
       SZ4P=(H/6.)*(GZ(X4,Y4,T4P,A)+4.*HALZ4P+2.*SZ4P+GZ(X4,Y4,T4P,B))
       BX1=0.125*(SX1+SX1P)
       B2X=0.125*(SX2+SX2P)
       B3X=0.125*(SX3+SX3P)
       B4X=0.125*(SX4+SX4P)
       BY1=0.125*(SY1+SY1P)
       B2Y=0.125*(SY2+SY2P)
       B3Y=0.125*(SY3+SY3P)
       B4Y=0.125*(SY4+SY4P)
       BZ1=0.125*(SZ1+SZ1P)
       B2Z=0.125*(SZ2+SZ2P)
       B3Z=0.125*(SZ3+SZ3P)
       B4Z=0.125*(SZ4+SZ4P)
       BX=BX1-(B3X+B4X)*0.8660255-(B3Y-B4Y)*0.28867517+(B3Z-B4Z)*0.816515
      1+B2X
       BY=BY1-B2Y*0.333333+B2Z*0.9428303+(-B3X+B4X)*0.8660255+
      1(B3Y+B4Y)*0.1666667-(B3Z+B4Z)*0.47141515
       BZ=BZ1-B2Y*0.9428303-B2Z*0.333333-(B3Y+B4Y)*0.9428303-(B3Z+B4Z)
      1*0.333333
       BB=(BX*BX+BY*BY+BZ*BZ)**0.5
       BPLANE=(BX*BX+BY*BY)**0.5
    30 WRITE(6,300)X,Y,BX1,BY1,BZ1,B2X,B2Y,B2Z,B3X,B3Y,B3Z,
      1B4X,B4Y,B4Z,BX,BY,BZ,BPLANE,BB
   300 FORMAT(10X,(2E20.5)/(6E15.6)/(6E15.6)/(5E15.6)///)
       STOP
       END
```

MAGNETIC WELL FOR PLASMA CONFINEMENT

BACKGROUND AND SUMMARY

The present invention relates to a magnetic well for confining or containing a plasma—i.e., an ionized gas. Such wells are useful, for example, for plasma confinement in nuclear fusion reactors, as well as other areas.

A plasma in a magnetic field will tend to drift to the weakest region of the field. Therefore a field which increases in an outward direction from the plasma will be best suited to keep the plasma together—i.e., "confined". Such field configurations are collectively known as magnetic wells.

The theory of a constricted gas current was first developed by W. H. Bennett in 1934 in his article in *Phys. Rev.*, Vol. 45, P. 890. A few years later, a different approach was presented independently by L. Tonks *Electrochem. Soc.*, Vol. 72, p. 167 (1937). Tonks theoretically analyzed the constriction of a current filament due to the action of the azimuthal magnetic field generated by the current itself, the effect of constriction was called the "pinch effect". Subsequently, a great number of experiments involving pinch discharges have been carried out and the theory of a pinch discharge is well developed.

Because of the loss of charged particles from the ends of a linear pinch, endless tubes of either toroidal or race-track form were studied, see, for example, W. H. Bostick, *USAEC Report Wash*-115, Wash., D. C., 1952, or J. L. Tuck, *USAEC Report Wash*-146, Wash., D. C., 1953. "AEC" stands for Atomic Energy Commission. But even if losses along the field lines are inhibited by using toroidal configurations where the lines close upon themselves inside the confinement region, particles may be lost through drift motions across the magnetic field. Losses of this type can be minimized, either by choosing a magnetic field where the drift motions cancel for particles running through the confinement region repeatedly, such as in a stellarator machine as described by L. Spitzer, "Magnetic Fields and Particle Orbits in a High-Density Stellarator", *AEC Report NYO*-997, New York Operations Office, 1952, or by having drift motions which follow closed paths inside the same region, see B. Lehnert, *Nature*, London Vol. 181, p. 331 (1958), or N. C. Christofilos, *Proc. Second Inter. Conf. on the Peaceful Uses of Atomic Energy*, Vol. 32, p. 279 (1958).

Another concept of confining plasma is the magnetic mirror system which is used to minimize the loss of charged particles from the ends when a plasma is confined by means of an externally applied axial magnetic field in a straight cylindrical tube, R. F. Post, *Proc. Second Int. Conf. On The Peaceful Uses of Atomic Energy*, Vol. 32, p. 245 (1958); M. Bineau, T. Consoli, P. Hubert, F. Prevot, P. Ricateau, and A. Samain, *Nucl. Instr.*, Vol. 5, p. 282 (1959); M. Bineau, T. Consoli, P. Hubert, P. Prevot, P. Ricateau, *Nucl. Instr.*, Vol. 5, p. 290 (1959).

In most systems, such as mentioned above, in which a plasma is confined by a magnetic field that surrounds it smoothly, i.e., without a discontinuity, there will be a tendency toward instability. A field where the field-plasma interface is everywhere convex on the side toward the plasma has been proposed to overcome this instability, H. Grad. *USAEC Report Wash*-289, Washington, D.C., 1955; *NYO*-7969, New York Operations Office, 1957; J. Berkowitz, K. O. Friedrichs, H. Goertzel, H. Grad, J. Killeen, and E. Rubin, *Proc. Second U.N. Conf. On Peaceful Uses of Atomic Energy*, Vol. 31, p. 171 (1958); B. B. Kadomtsev and S. I. Braginsky, *Proc. Second U.N. Conf. On Peaceful Uses of Atomic Energy*, Vol. 32, p. 233 (1958); C. L. Longmire, *USAEC Report Wash*-289, -289, Washington, D.C. 1955; J. L. Tuck, USAEC Report Wash-289, Washington, D. C., 1955. Systems with this kind of field are called cusped magnetic fields. The cusped systems generally have linear or cylindrical geometry and yield one- or two-dimensional confinement only.

Other confinement systems, such as the "mirror-type" magnetic field of "Baseball II" are known, see C. C. Damm, H. Berkner, W. S. Cooper III, K. W. Ehlers, A. H. Futch, G. W. Hamilton, J. E. Osher, R. V. Pyle, *Fourth Conference on Plasma Physics and Controlled Nuclear Fusion Research*, Madison, Wisconsin, CONF-710607-98, 1971. This was the first field with a considerable degree of three-dimensional symmetry; but it does not have a spherical symmetry, i.e., the field configuration is not very isotropic. The present invention provides a more nearly spherically symmetric magnetic field, with field lines that have characteristics of cusped magnetic field as well. In addition, the following patents are known: U.S. Pat. Nos. 3,214,342, 3,218,235, 3,230,145, 3,290,219, 3,442,758, 3,561,033, 3,523,206, 3,650,893, 3,663,360, 3,155,592, 3,663,362, 3,665,508, 3,708,391.

Magnetic wells used to date generally have had cylindrical or toroidal symmetry. A more uniform (or isotropic) symmetry is desirable. A spherical symmetry, i.e., a totally isotropic well configuration, would be best, but this is all but impossible to achieve as a practical matter. We have discovered how to achieve polyhedral symmetry, which comes closest to the spherical one. This is achieved by locating current-carrying coils on planes corresponding to the facets of a regular polyhedron that can be symmetrically circumscribed about or within a sphere (hereinafter simply called "regular polyhedrons"). There are five such polyhedrons: tetrahedron (four sides), cube (six sides), octahedron (eight), duodecahedron (12), and icosahedron (12).

One such coil or loop configuration is analyzed in detail and corresponds to a coil on each of the eight facets of an octahedron. In this way, each coil passes through three of the six geometric poles on a reference sphere, i.e., the points where each axis of rectangular coordinates concentric with the sphere would cut its surface. Thus, the coils are arranged into four opposing sets or pairs. The axis of each set of loops is angularly displaced from that of the other three sets as the three apexes of a regular tetrahedron. By arranging the loops in this manner, a magnetic field with tetrahedral symmetry will be produced.

The strength and direction of the resulting magnetic field have been calculated, and the motion of charged particles in this field has been studied. Experiments were also made to show the characteristics of this magnetic field.

The features and advantages of the present invention will become apparent from the following detailed description, together with the accompanying drawings.

THE DRAWING

FIGS. 11A–11C comprise a computer program for computing the magnetic field produced by a current loop arrangement of FIGS. 3 and 4.

DETAILED DESCRIPTION

Figure 1:
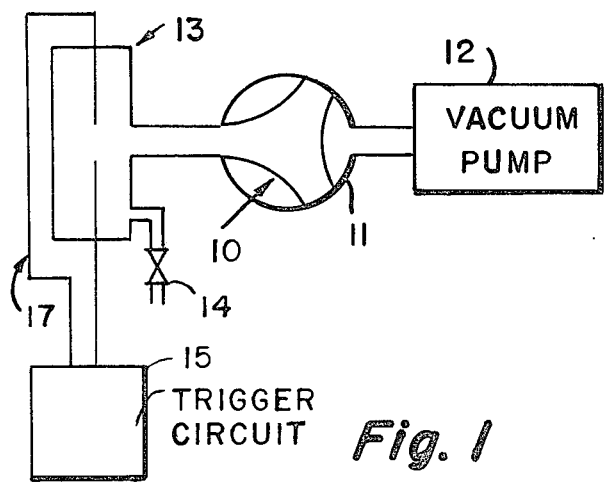
FIG. 1 is a functional block diagram of a system for generating a plasma.

Referring first to FIG. 1, there is shown a functional diagram of a system in which the present invention may be used, the system shown being primarily intended as a research system for investigating plasma confinement and compression characteristics of magnetic wells with three-dimensional symmetry. As seen there, reference numeral 10 generally designates a magnetic well which is enclosed in an evacuated chamber 11. A vacuum system 12 is used to establish and maintain the vacuum within the chamber 11. A plasma gun 13 is used to inject the ionized gas into the evacuated chamber 11 where it is held by the magnetic well 10. The gun 13 includes a gas inlet 14 for admitting preselected quantities of a predetermined gas being studied; and a trigger circuit 15 is used to supply electrical energy to the plasma gun 13 by means of the structure known in the art as a backstrap electrode structure generally designated by reference numeral 17.

Ionized gas or plasma is formed within the gun 13 and communicated by means of a conduit 18 into the chamber 11 where it is held by means of the magnetic well 10. The coils which form the magnetic well may be placed outside of the vacuum chamber 11, and they are not illustrated in FIG. 1.

The apparatus of FIG. 1 may be used to measure plasma leakage from the well and to study, for example, the behavior of a plasma undergoing compression in an increasing field.

In addition to the apparatus which is shown, a function generator may be used to transmit signals of different waveforms through the plasma, the deformation of the received signal would be analyzed to yield information concerning wave-plasma interactions. Other applications could readily be conceived.

Figure 2:
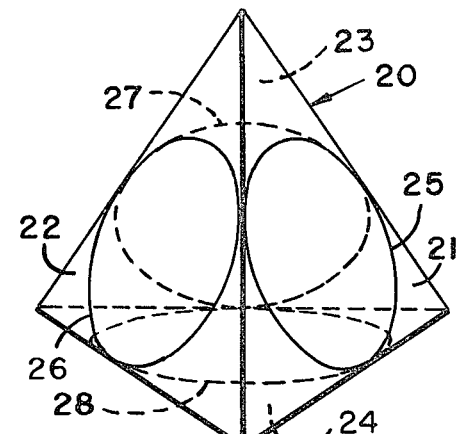
FIG. 2 is a diagrammatic illustration showing a coil configuration for tetrahedral symmetry.

Turning now to FIG. 2, there is shown a coil configuration for achieving tetrahedral symmetry, the tetrahedron is shown in perspective and designated 20, the lines closest to the observer being solid. The tetrahedron 20 has four planar faces or "facets," two of which could be seen by the observer if the tetrahedron were solid. These are designated 21 and 22. There is also a rear hidden facet 23, and a bottom facet 24. On each of the facets 21–24, there is a coil, and these are designated respectively 25–28.

The tetrahedron 20 is a regular tetrahedron—that is, it could be circumscribed about a sphere or a sphere could be circumscribed about it. In the former case, all facets of the tetrahedron are tangential to the surface of the sphere, and in the latter case, the surface of the sphere intersects with each of the four corners of the tetrahedron in a symmetrical manner.

Each of the coils 25-28 is a current-carrying conductor; and the words "coil" or "loop" are intended in a very broad sense to include a single conductor loop, a multiplicity of loops, a super-conducting element, and all other current-conducting elements. When it is stated that a coil or loop in this broad sense, is located in a plane which corresponds to a facet of a polyhedron, it will be appreciated that the polyhedron is imaginary, and that obviously a coil or current-carrying loop has three dimensions and cannot exist in a two-dimensional plane. In other words, the invention can be practiced even though the coil extends in an axial direction. It will be observed that each of the coils of FIG. 2 lies in a plane corresponding to one facet of a tetrahedron and is tangential to planes corresponding to the other three facets, but this is not absolutely necessary. For example, each of the schematic circles representing a loop could intersect with the corners of the triangular shape of its associated facet, and a magnetic well would still be formed. Again, in this case, two coils having physical dimensions cannot "intersect" at a point, and what is meant that they may pass over one another but they should be kept as close as possible to the ideal configuration. Further, the size of the coils are not limited to the specific configurations just described, but may range anywhere between the two configurations just described, or they may be smaller or larger than the two configurations described. The coils need not be in a plane of a facet of a polyhedron, but may be displaced from that plane to one which is parallel to it. This is also true for coils associated with the other regular polyhedral shapes.

In determining the direction of current flow for the tetrahedral symmetry shown in FIG. 2, current must flow in the loops in such a direction that, using the righthand rule for determining magnetic polarity, if the fingers are pointed in the direction of current flow around the loop (assuming current flow to be opposite direction of electron migration), and the thumb extended, the thumb must extend toward the interior of the polyhedron for all coils, or it must extend outwardly for all coils. This will insure that the net magnetic field at the center will be minimized, thereby creating the magnetic well, with the magnetic field increasing as one proceeds in all directions from the center. In this sense, the center is a point represented by the intersection of lines perpendicular to each facet of the tetrahedron and passing through the center of the circles representing the loops.

Figure 3:
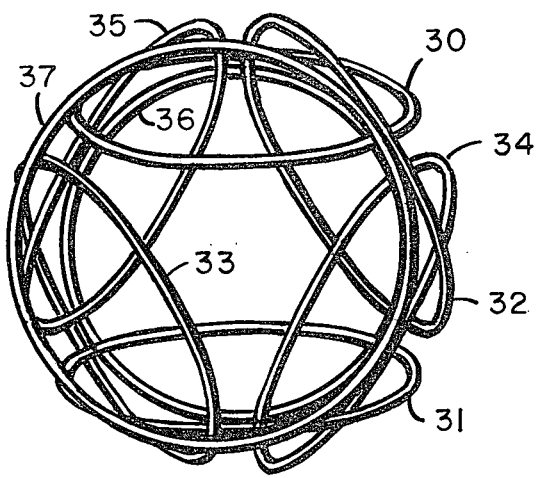
FIGS. 3 and 4 are views taken respectively from different angles showing an arrangement of four pairs of current loops having octahedral symmetry.
Figure 4:
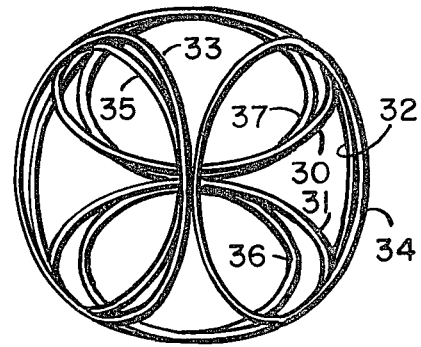

Turning now to FIGS. 3 and 4, there is shown an arrangement of the coils for octahedral symmetry— that is, there are eight coils, one placed to correspond with each of the eight sides of a regular octahedron, the drawings being taken from different perspectives obviously.

In FIG. 3, there is a first pair of coils 30, 31 which are parallel and geometrically opposing and located at upper and lower surfaces. There is a second set of opposing coils designated respectively 32, 33. The coils of a third opposing pair are designated respectively 34, 35, and the fourth pair are designated respectively 36, 37. For this embodiment, each of the circular loops 30–37 are placed in a plane which corresponds to one facet of the octahedron (which is not shown for clarity) with the loops being of a size to intersect with the corners of an associated facet—as distinguished from being circumscribed by the periphery of the facet.

Because of its double symmetry, the direction of current flow in the loops for an octahedral structure can be such that opposing pairs of coils may generate reinforcing, rather than opposing fields. That is to say, each reinforced field then becomes equivalent to one of the fields produced by a tetrahedral structure, and the system reduces to a tetrahedral well. In this case, however, the reinforced fields of each opposing pair must all extend inwardly or outwardly (in a vector sense) from the center of the octahedron. Alternatively, the field produced by each individual coil may extend inwardly or outwardly, but they all must have the same inward or outward orientation relative to the center of the octahedron. By extending "inwardly" or "outwardly" it is meant that a common pole, such as the north pole would extend in that direction. However, the south pole could equally well apply.

Figure 5:
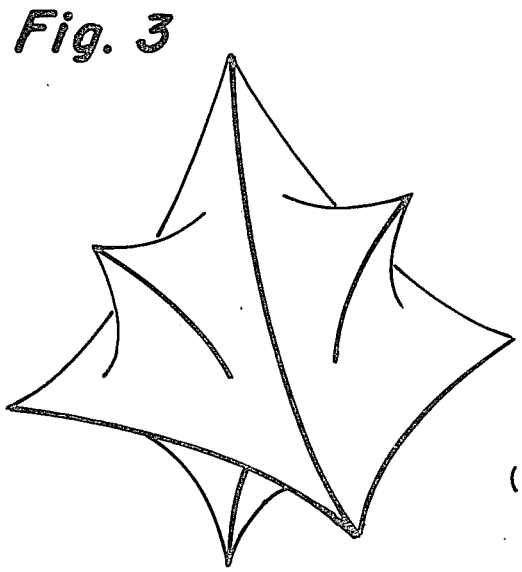
FIG. 5 is an illustration of a magnetic flux surface generated by the magnetic field for the coil arrangement of FIGS. 3 and 4.

FIG. 5 is a representation of a magnetic flux surface generated by the magnetic field for the octahedral structures of FIGS. 3 and 4 with the fields of each loop of an opposing pair reinforcing each other. An "opposing" pair of coils in this sense indicates that the planes of the octahedron with which the pair of coils are associated are parallel so that the coils face or "oppose" each other, although, as mentioned, their respective magnetic fields may either reinforce or oppose each other, for this particular case.

The magnetic flux surface of FIG. 5 is generated by tracing all flux lines passing through locations equidistant from the poles of each of the eight coils or current loops. That is to say, if the radius of each coil is five centimeters, if one would trace the flux lines passing through all of the coils at a distance of four centimeters from the center of each coil, one would generate an envelope such as that shown in FIG. 5.

One opposing pair of a set of coils such as previously described includes two parallel circular current loops (designated 40, 41 in FIG. 6) that are separated by a distance equal to $\sqrt{2}$ times the loop radius. The magnetic field of this set of coils is similar to, but not identical to, that of a pair of Helmholtz coils (where the separation is exactly equal to the loop radius). Consequently, the axial variation in the magnetic field is greater than for a set of Helmholtz coils, where the field strength is almost constant in the region between the coils.

Figure 6:
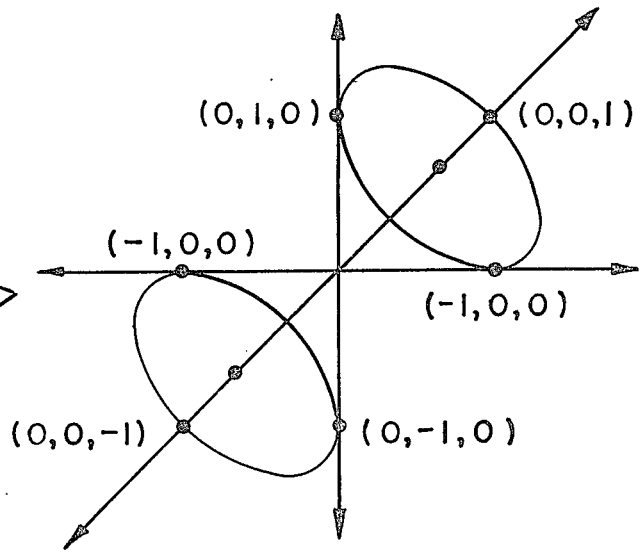
FIG. 6 illustrates the position of one pair of coils, for analysis purposes, for the configuration of FIGS. 3 and 4 with respect to a Cartesian Coordinate system.
Figure 6A:
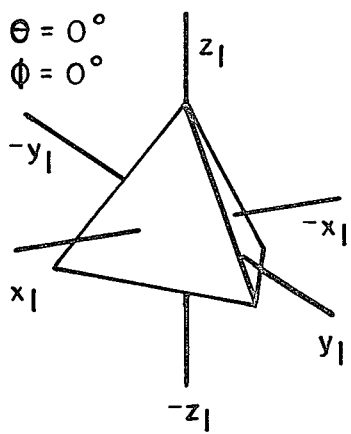
FIGS. 6A, 6B, 6C and 6D illustrate various coordinate transformations used for analysis of a magnetic field.

To analyze the field between a pair of coils such as shown in FIG. 6, consider a thin wire bent into a circular loop and carrying a current I. The radius of the loop is R, and its center is located at the point (0,0,0). The loop lies in the $xy$-plane, as shown in FIG. 6A. The field B at all space points may be computed by the Biot-Savart law. By this law, B is given by the integral as:

$$\vec{B} = \frac{\mu_0 I}{4\pi} \oint_0 \frac{d\vec{l} \times \vec{\gamma_1}}{\gamma_1^3} \qquad (1)$$

From FIG. 6A, it is clear that $$d\vec{l} = R d\phi' (-\sin\phi' \hat{x} + \cos\phi' \hat{y})$$

and $$\vec{\gamma_1} = (x - R\cos\phi')\hat{x} + (y - R\sin\phi')\hat{y} + z\hat{z}$$

Where $\hat{x}$, $\hat{y}$ and $\hat{z}$ are the three unit direction vectors in the Cartesian Coordinates.

Consequently, $$d\vec{l} \times \vec{\gamma_1} = [z\cos\phi'\hat{x} + z\sin\phi'\hat{y} - (y\sin\phi' + x\cos\phi' - R)\hat{z}] R d\phi'$$

We now obtain for the field B the expression:

$$\vec{B} = \frac{\mu_0 I}{4\pi} \int_0^{2\pi} [z\cos\phi'\hat{z} + z\sin\phi'\hat{y} - (y\sin\phi' + x\cos\phi' - R)\hat{z}] \cdot R d\phi' [(x - R\cos\phi')^2 + (y - R\sin\phi')^2 + z^2]^{-3/2}$$

$$= \vec{B}_x(x, y, z) + \vec{B}_y(x, y, z) + \vec{B}_z(x, y, z) \qquad (2)$$

where $$\vec{B}_x(x, y, z) = \frac{\mu_0 I \hat{x}}{4\pi} \int_0^{2\pi} z\cos\phi' \cdot R \cdot [(x - R\cos\phi')^2 + (y - R\sin\phi')^2 + z^2]^{-3/2} d\phi' \qquad (3)$$

$$\vec{B}_y(x, y, z) = \frac{\mu_0 I}{4\pi} \int_0^{2\pi} z\sin\phi' \cdot R \cdot [(x - R\cos\phi')^2 + (y - R\sin\phi')^2 + z^2]^{-3/2} d\phi' \qquad (4)$$

$$\vec{B}_z(x, y, z) = \frac{\mu_0 I}{4\pi} \int_0^{2\pi} -(y\sin\phi' + x\cos\phi' - R) \cdot R \cdot [(x - R\cos\phi')^2 + (y - R\sin\phi')^2 + z^2]^{-3/2} d\phi' \qquad (5)$$

Next, let the center of the reference coordinates be shifted to the midway point on the axis of the two parallel current loops. Then the magnetic field produced by this set of current loops is the superposition of the magnetic fields produced separately by two single current loops as in FIG. 6A with the origins at $(0,0,z - \sqrt{2}/2 R)$ and $(0,0,z + \sqrt{2}/2 R)$, respectively. The field produced by this set of current loops is then given by:

$$\vec{B} = \vec{B}_x(x,y,z - \sqrt{2}/2\ R) + \vec{B}_y(x,y,z - \sqrt{2}/2\ R) + \vec{B}_z(x,y,z - \sqrt{2}/2\ R) + \vec{B}_x(x,y,z + \sqrt{2}/2\ R) + \vec{B}_y(x,y,z + \sqrt{2}/2\ R) + \vec{B}_z(x,y,z + \sqrt{2}/2\ R) \qquad (6)$$

The integrations of Equations (3, 4 and 5) can be carried out by using infinite Legendre polynomials to represent the integrand and then integrating them. One can use numerical approximation to evaluate the integral. Though it is only approximately correct, the accuracy is good enough for comparison with experimental results.

The numerical calculation can be done by computer, using the program shown in FIGS. 11A–11C.

TOTAL FIELD FOR ALL FOUR SETS OF COILS

Coordinate Transformations

Equation (6) gave the magnetic field resulting from the currents in one pair of loops, where the z axis was chosen as the axis for that particular set. To calculate the collective field for all four sets, where the axis of each set is displaced from each of the other axis by 109.47°, (the tetrahedral angle), as shown in FIGS. 6A–6D, one has to transform all the coordinates to a common system.

Figure 6B:
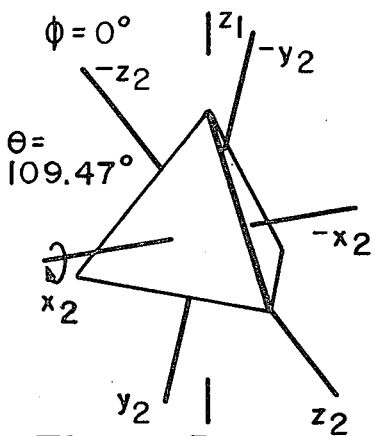
Figure 6C:
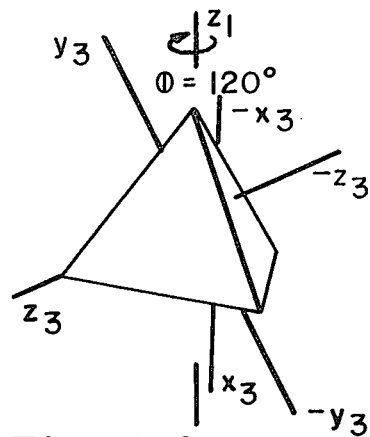
Figure 6D:
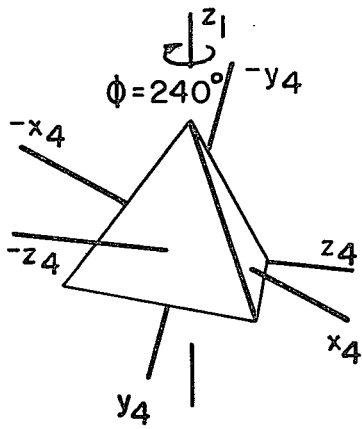
Figure 6E:
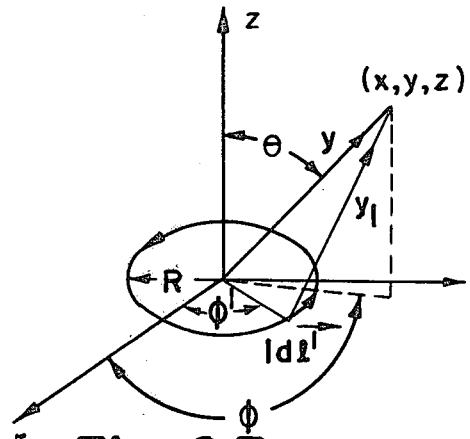
FIG. 6E illustrates the coordinate system used to analyze the magnetic field for a single loop.

When the coordinates $(x_1, y_1, z_1)$ are rotated clockwise through an angle of 109.47° about the $x_1$ axis, then the $-y$ axis will intersect with one of the edges of imaginary tetrahedron at a point that is one-fourth of the length of the edge removed from the apex of the tetrahedron as shown in FIG. 6B. The $z$ axis will now become the axis of a second set of coils. If the rotated set of coordinates is designated by $(x_2, y_2, z_2)$, the relationship between $(x_1, y_1, z_1)$ and $(x_2, y_2, z_2)$ is given by vector transformation theory as:

$$\begin{bmatrix} x_2 \\ y_2 \\ z_2 \end{bmatrix} = \begin{bmatrix} 1 & 0 & 0 \\ 0 & \cos\theta & -\sin\theta \\ 0 & \sin\theta & \cos\theta \end{bmatrix} \begin{bmatrix} x_1 \\ y_1 \\ z_1 \end{bmatrix} \quad (7)$$

where $\theta = 109.47°$

The complicated geometric relationship makes the transformation from the coordinates $(x_3, y_3, z_3)$ to the coordinates $(x_1, x_1, z_1)$ more difficult than that of $(x_2, y_2, z_2)$ to $(x_1, y_1, z_1)$.

The coordinates $(x_1, y_1, z_1)$ are first rotated clockwise through an angle of 120° about the $z_1$ axis (FIG. 6C) to get a new set of coordinates $(x_1', x_1', z_1')$ with the relationship as:

$$\begin{bmatrix} x_1' \\ y_1' \\ z_1' \end{bmatrix} = \begin{bmatrix} \cos\phi & -\sin\phi & 0 \\ \sin\phi & \cos\phi & 0 \\ 0 & 0 & 1 \end{bmatrix} \begin{bmatrix} x_1 \\ y_1 \\ z_1 \end{bmatrix} \quad (8)$$

where $\theta = 120°$.

We then rotate the coordinates $(x_1', y_1', z_1')$ clockwise through an angle 109.47° about the $x_1'$ axis to get the coordinates $(x_3, y_3, z_3)$ with the relationship as:

$$\begin{bmatrix} x_3 \\ y_3 \\ z_3 \end{bmatrix} = \begin{bmatrix} 1 & 0 & 0 \\ 0 & \cos\theta & -\sin\theta \\ 0 & \sin\theta & \cos\theta \end{bmatrix} \begin{bmatrix} x_1' \\ y_1' \\ z_1' \end{bmatrix} \quad (9)$$

Combining Equation (8) and Equation (9), the result is:

$$\begin{bmatrix} x_3 \\ y_3 \\ z_3 \end{bmatrix} = \begin{bmatrix} \cos\phi & \sin\phi & 0 \\ \sin\phi\cos\theta & \cos\phi\cos\theta & -\sin\theta \\ \sin\phi\sin\theta & \cos\phi\sin\theta & \cos\theta \end{bmatrix} \begin{bmatrix} x_1 \\ y_1 \\ z_1 \end{bmatrix} \quad (10)$$

Transformation to $(x_4, y_4, z_4)$ involves a similar procedure, except that we first rotate about $z_1$ axis 240° (FIG. 6D) instead of 120°. This leads to:

$$\begin{bmatrix} x_4 \\ y_4 \\ z_4 \end{bmatrix} = \begin{bmatrix} \cos\phi & \sin\phi & 0 \\ -\sin\phi\cos\theta & \cos\phi\cos\theta & -\sin\theta \\ -\sin\phi\sin\theta & \cos\phi\sin\theta & \cos\theta \end{bmatrix} \begin{bmatrix} x_1 \\ y_1 \\ z_1 \end{bmatrix} \quad (11)$$

Inserting the numerical values into Equations (7, 10 and 11), we get:

$$\begin{bmatrix} x_2 \\ y_2 \\ z_2 \end{bmatrix} = \begin{bmatrix} 1 & 0 & 0 \\ 0 & -0.33333 & -0.9428 \\ 0 & 0.9428 & -0.33333 \end{bmatrix} \begin{bmatrix} x_1 \\ y_1 \\ z_1 \end{bmatrix} \quad (12)$$

$$\begin{bmatrix} x_3 \\ y_3 \\ z_3 \end{bmatrix} = \begin{bmatrix} -0.500 & -0.866 & 0 \\ -0.2887 & 0.1667 & -0.9428 \\ 0.8165 & -0.4914 & -0.33333 \end{bmatrix} \begin{bmatrix} x_1 \\ y_1 \\ z_1 \end{bmatrix} \quad (13)$$

and $$\begin{bmatrix} x_4 \\ y_4 \\ z_4 \end{bmatrix} = \begin{bmatrix} -0.500 & 0.866 & 0 \\ 0.2887 & 0.1667 & -0.9428 \\ -0.8165 & -0.4714 & -0.33333 \end{bmatrix} \begin{bmatrix} x_1 \\ y_1 \\ z_1 \end{bmatrix} \quad (14)$$

SUMMATION OF FIELDS

The total field of four sets of coils is the superposition of the fields produced by each individual set. As stated position of the fields produced by each individual set. As stated previously, Equation (6) shows the field produced by a single set of coils. The total magnetic field is then given by:

$$\vec{B}_T = \sum_{i=1}^{4} \left( \vec{B}_{x_i} + \vec{B}_{y_i} + \vec{B}_{z_i} \right)$$

$\vec{B}_{x_i}, \vec{B}_{y_i}, \vec{B}_{z_i}$ can be expressed in terms of only one coordinate system $(x_1, y_1, z_1)$ by using Equations (12, 13 and 14). The unit direction vectors $\hat{x}_i, \hat{y}_i$ and $\hat{z}_i$ also have to be transformed to the common coordinate system, i.e., the $\hat{x}_1, \hat{y}_1, \hat{z}_1$ direction vectors.

According to Equation (6), the field produced by the second set of coils at the space point $(x_1, y_1, z_1)$ is:

$$\vec{B}_2 = \vec{B}_{x_2}(x_1, y_1, z_1 - \sqrt{2}/2\ R) + \vec{B}_{x_2}(x_1, y_1, z_1 + \sqrt{2}/2\ R) + \vec{B}_{y_2}(x_1, y_1, z_1 - \sqrt{2}/2\ R)\ \vec{B}_{y_2}(x_1, y_1, z_1 + \sqrt{2}/2\ R) + \vec{B}_{z_2}(x_1, y_1, z_1 - \sqrt{2}/2\ R) + B_{z_2}(x_1, y_1, z_1 + \sqrt{2}/2\ R)$$

By using Equation (7), this becomes:

$$\vec{B}_2 = B_{x_2} \cdot \hat{x}_1 + B_{y_2} \cdot (\hat{y}_1 \cos\theta - \hat{z}_1 \sin\theta) + B_{z_2} \cdot (\hat{y}_1 \sin\theta + \hat{z}_1 \cos\theta)$$

where, $$B_{x_2} = \frac{\mu_0 I}{4\pi} \int_0^{2\pi} (y_1 \sin\theta + z_1 \cos\theta) \cdot \cos\theta' \cdot R \cdot [(x_1 - R\cos\theta')^2$$

$$+ (y_1 \cos\theta - z_1 \sin\theta - R\sin\theta')^2 + (y_1 \sin\theta + z_1 \cos\theta$$

$$- \sqrt{2}/2 \, R)^2]^{-3/2} \cdot d\phi' + \frac{\mu_0 I}{4\pi} \int_0^{2\pi} (y_1 \sin\theta + z_1 \cos\theta)$$

$$+ \cos\phi' \cdot R \cdot [(x_1 - R\cos\phi')^2 + (y_1 \cos\theta - z_1 \sin\theta - R\sin\phi')^2$$

$$+ (y_1 \sin\theta + z_1 \cos\theta + \sqrt{2}/2 \, R)^2]^{-3/2} \cdot d\phi',$$

$$B_{y_2} = \frac{\mu_0 I}{4\pi} \int_0^{2\pi} (y_1 \sin\theta + z_1 \cos\theta) \cdot \sin\phi' \cdot R \cdot [(x_1 - R\cos\phi')^2$$

$$+ (y_1 \cos\theta - z_1 \sin\theta - R\sin\phi')^2 + (y_1 \sin\theta + a_1 \cos\theta$$

$$- \sqrt{2}/2 \, R)^2]^{-3/2} \cdot d\phi' + \frac{\mu_0 I}{4\pi} \int_0^{2\pi} (y_1 \sin\theta + z_1 \cos\theta)$$

$$\cdot \sin\phi' \cdot R \cdot [(x_1 - R\cos\phi')^2 + (y_1 \cos\theta - z_1 \sin\theta - R\sin\phi')^2$$

$$+ (y_1 \sin\theta + z_1 \cos\theta + \sqrt{2}/2 \, R)^2]^{-3/2} \cdot d\phi'$$

and $$B_{z_2} = \frac{\mu_0 I}{4\pi} \int_0^{2\pi} - [(y_1 \cos\theta - z_1 \sin\theta) \sin\phi' + x_1 \cos\phi' - R]$$

$$\cdot [(x_1 - R\cos\phi')^2 + (y_1 \cos\theta - z_1 \sin\theta - R\sin\phi')^2$$

$$+ (y_1 \sin\theta + z_1 \cos\theta - \sqrt{2}/2 \, R)^2]^{-3/2} \cdot d\phi'$$

$$+ \frac{\mu_0 I}{4\pi} \int_0^{2\pi} - [(y_1 \cos\theta - z_1 \sin\theta) \sin\phi' + x_1 \cos\phi' - R]$$

$$\cdot [(x_1 - R\cos\phi')^2 + (y_1 \cos\theta - z_1 \sin\theta - R\sin\phi')^2$$

$$+ (y_1 \sin\theta + z_1 \cos\theta + \sqrt{2}/2 \, R)^2]^{-3/2} \cdot d\phi'$$

are the magnitudes of the $x$, $y$ and $z$ components of $B_2$.

The other fields can be transformed to the same set of coordinates in a similar manner. By doing so, the total magnetic field becomes:

$$\vec{B}_T(x_1, y_1, z_1) = \vec{B}_{T_x}(x_1, y_1, z_1) + \vec{B}_{T_y}(x_1, y_1, z_1) + \vec{B}_{T_z}(x_1, y_1, z_1)$$

where $$\vec{B}_{T_x}(x_1,y_1,z_1) = B_{x_1} + B_{x_2} + (B_{x_3} + B_{x_4}) \cos\phi + (B_{v_3} - B_{v_4})\sin\phi\cos\theta + (B_{x_3} - B_{x_4})\sin\phi\sin\theta \quad (15)$$

$$\vec{B}_{T_y}(x_1,y_1,z_1) = B_{v_1} + B_{v_2} \cos\theta + B_{z_2} \sin\theta + (-B_{x_3} + B_{x_4})\sin\phi + (B_{v_3} + B_{v_4})\cos\phi\cos\theta + (B_{z_3} + B_{z_4})\cos\phi\sin\theta \quad (16)$$

and $$\vec{B}_{T_z}(x_1,y_1,z_1) = B_{z_1} - B_{v_2} \sin\theta + B_{z_2} \cos\theta - (B_{v_3} + B_{v_4})\sin\theta + (B_{z_3} + B_{z_4})\cos\theta \quad (17)$$

Again, FIGS. 11A–11C show the computer program for calculating the total field numerically.

MOTION OF CHARGED PARTICLES IN THE MAGNETIC WELL

The motion of a particle in a collection of charged particles is not only determined by the external field but also by the fields of the other particles. If the prescribed electric and magnetic fields are zero or uniform in space and constant in time, the particle motion is elementary. If the fields are not so simple, an exact solution of the equations of motion is not always possible. Nevertheless, some approximate description of the motion is useful in dealing with plasmas analytically.

In a uniform magnetic field and zero electric field a line charged particle moves in a helical path. The motion may be described exactly as motion about a circle whose center is moving along a line of force. If the field is not quite uniform (or not quite time-independent) the charged particle's motion will not be quite helical but something approximating helical motion will still be discernible.

In general, the motion of charged particle in a nonuniform magnetic field can be divided into two components, one along the line of force as in uniform field, and the other in a direction perpendicular to the line of force.

The motion of the guiding center in a direction perpendicular to the line of force is called the drift velocity. In most systems, this drift velocity will result in charge separation in a plasma containing a multitude of both positive and negative charges. This charge separation will give rise to an electric field, which in combination with the magnetic field will lead to a drift of the plasma as a whole. A plasma in an inhomogeneous field will tend to drift from the regions where the field is stronger into regions where the field is weaker. This often leads to instabilities. In the system discussed here, however, the magnetic field increases in every direction away from the center of the plasma, and the drift velocity will not tend to disrupt the plasma, as usually is the case. The drift velocity in the magnetic field described above will now be analyzed.

Consider now the case in which there is a charged particle moving in a constant, homogeneous magnetic field subject to an external force.

Assume this additional force to be constant in space and time. The equation of motion of the particle is then:

$$\vec{F} + q\vec{V} \times \vec{B} = M \, d\vec{V}/dt \tag{18}$$

For the integration of this equation we write down the equations for parallel and perpendicular components:

$$\vec{F}_\parallel = m \frac{d\vec{V}_\parallel}{dt} \tag{19}$$

$$q\vec{V}_\perp \times \vec{B} + \vec{F}_\perp = m \frac{d\vec{V}_\perp}{dt} \tag{20}$$

The motion along the field lines is not influenced by the magnetic field itself; it is determined exclusively by the parallel component of F.

In order to integrate Equation (2), let $V_\perp{}^0$ be the solution of the corresponding equation, in the absence of F; i.e., the solution of homogeneous equation:

$$q\vec{V}_\perp{}^0 \times \vec{B} = m\vec{V}$$

$V_\perp{}^0$ represents therefore the usual cyclotron motion. The general solution of Equation (20) is given by:

$$\vec{V}_\perp = \vec{V}_\perp{}^0 + \vec{F}_\perp \times \vec{B}/qB \tag{21}$$

The solution is therefore a velocity made up of two terms, namely the normal cyclotron velocity, as if there were no external force, plus a constant velocity which is the drift velocity $V_D$:

$$\vec{V}_D = \vec{F}_\perp \times \vec{B}/qB \tag{22}$$

This velocity is perpendicular to both B and F.

The magnetic field described herein is not homogeneous and the charged particle motion is not so simple as in a homogeneous magnetic field, because of the inhomogeneity of the field and the influence of the curvature of the field lines. Due to these influences, the motion of the charged particle becomes quite complicated and it becomes very difficult to find an analytic solution describing the motion. But quantitatively, we can consider the inhomogeneity, i.e., gradient of B, and the influence of the curvature of the magnetic field lines as the external forces exerted on the particle in a homogeneous field as discussed above. From this point of view, there will be two drift velocities. $\vec{V}_G$ and $\vec{V}_c$, caused by the gradient of B and the influence of the curvature of magnetic field lines, respectively. $\vec{V}_G \propto \vec{B} \times \nabla B$ and $\vec{V}_C \propto \vec{B} \times \vec{F}_C$, as can be shown directly with the aid of Equation (22). $\vec{F}_C$ is the centrifugal force exerted on the particle by the curvature of a magnetic field line, as the particle moves along that line. An analysis will show that the drift velocities will force charged particles to move around the center of the magnetic well due to its three-dimensional symmetry. Because of the three-dimensional symmetry, the drift velocities will not cause the particles to drift radially. The negatively charged particles and the positively charged particles will move around the center of the magnetic well in opposite directions, (i.e., clockwise and counterclockwise). This circulation does not lead to charge separation, which is the main reason for instability in other magnetic confinement devices, (for example, in a toroidal geometry as in the stellarator).

In order to verify the configuration of the abovedescribed magnetic field, a set of current loops was constructed in accord with the tetrahedral symmetry—i.e., the loops were placed on the facets of a regular octahedron with the fields of each opposing pair of loops reinforcing each other, as a pair; but the pairs, as units, oppose one another. High current at a low voltage was supplied to the current loops to produce a magnetic field. The configuration of this field was investigated by the use of a Gaussmeter to measure the strength of the field at space points. The experimental results conform the calculated results. The general configuration of the field was also demonstrated by sprinkling iron powder on a flat plane positioned within the coils. The iron powder then ordered itself along the field lines, giving a clear picture of the field configuration in the given plane.

Instrumentation

The current for producing magnetic field was supplied by a 0–25ampere power supply. The voltage of this power supply (0–12v) was regulated by a powerstat to prevent high temperatures which would result in the damage to the current loops. The relation between current and voltage of the power supply is linear. A Bell 640 incremental Gaussmeter was used to measure the magnetic field strength. This meter has a range of from 1 to 30 k Gauss.

The magnetic field strength was also calculated by computer, using the numerical methods discussed previously. In order to compare the theoretical values with measured values, a Bell 640 incremental Gaussmeter was used to measure the strength of the field at different space points.

Figure 7:
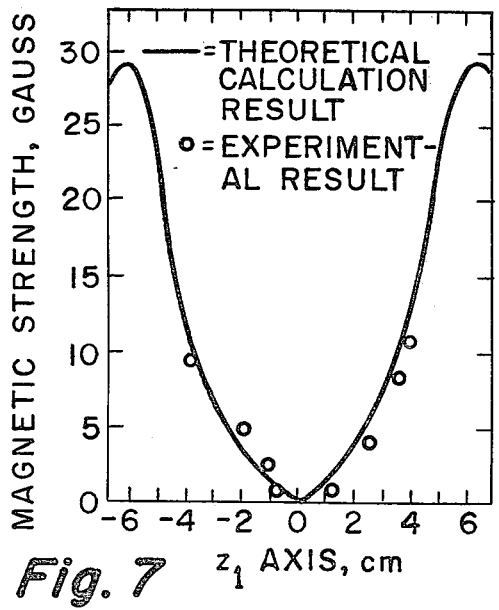
FIG. 7 is a plot of magnetic strength of the embodiment of FIGS. 3 and 4 as a function of position along the $z_1$ axis.

As stated previously, the strength of the magnetic field along $z_1$-axis and $x_1$-axis was found by both calculation and experiment. The results are listed in Tables 1, 2, 3 and 4. FIGS. 6 and 7 show the comparative results of calculation and experiment.

The strength of the magnetic field along $z_1$-axis is symmetric about the center, as is the strength along the $x_1$-axis; but due to the field configuration, the symmetry along the $z_1$ axis is somewhat different than the symmetry along the $x_1$-axis.

Figure 8:
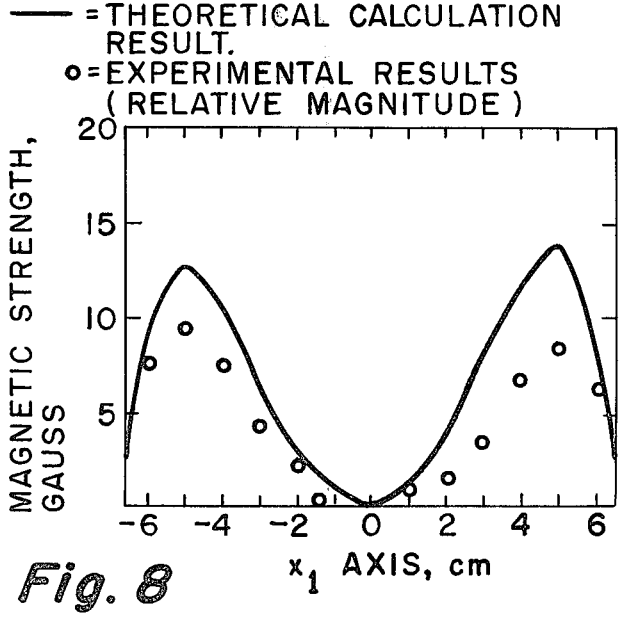
FIG. 8 is a plot of the calculated magnetic field strength for the embodiment of FIGS. 3 and 4 as a function of position along the $x_1$ axis.

An unexpected characteristic of this magnetic well is that the maximum strength does not occur at the well boundaries as demarcated by the coils, but occurs at positions a little bit inside them, as can be seen from FIGS. 7 and 8.

The experimental results are in good agreement with the calculated results, as can be seen from FIG. 7. The deviation between them is only about 5%, but in FIG. 8, although the positions of the maximum strength for both experimental and calculated results are in good agreement, their magnitudes are different. This can be considered a result of the orientation of the Gaussmeter. There is a square element in the point of the probe of the meter. Magnetic fields entering the element at some angle to the surface cause an output response proportional to the magnitude of the field component at right angles to the element. That is, to say, the response will be B Cos$\theta$ where B is the field magnitude and $\theta$ is the angle of the field relative to the direction perpendicular to the element. In measuring the strength of the magnetic field along $z_1$-axis, there is only one component $B_z$, (the others are negligibly small), the reading equals the actual strength of the field. But in the case of the measurement of B along the $x_1$-axis, the orientation of the field is different and it is not possible to measure the absolute value of the field strength without knowing the field orientation. This explanation is supported by the facts that all the values of experimental results are almost exactly 1.5 times less than that of the calculated results in the corresponding positions. The maximum and the minimum strength positions are coincident for experimental and calculated results.

Figure 9:
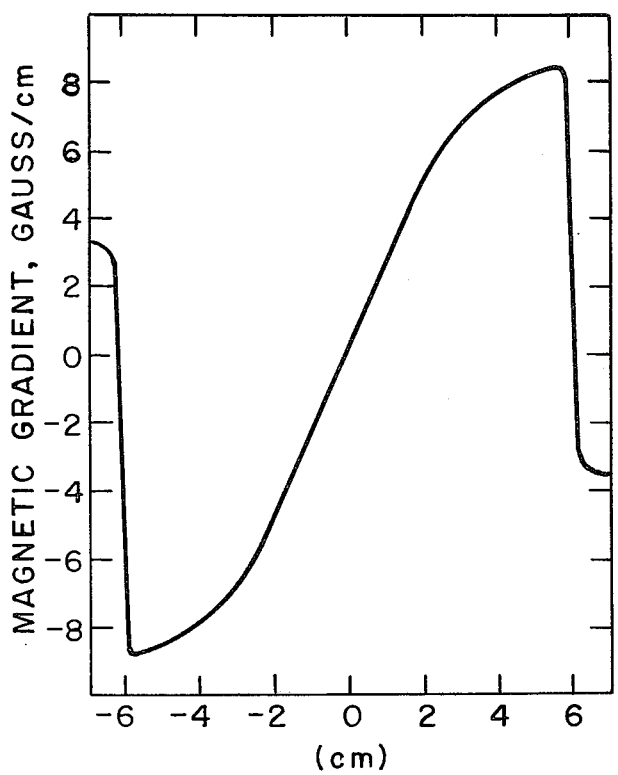
FIG. 9 is a calculated plot of the magnetic gradient as a function of position along the $z_1$ axis.

In order to estimate the drift velocity described above, the values of the gradient of B at every position have to be found. These can be calculated in the same manner as was used to calculate the strength of the magnetic field. Instead, only the gradient of B in the z direction was found by calculating the slopes of the curve in FIG. 7 at some positions. FIG. 9 shows the results.

The good agreement between experimental results and calculated results shows that the formula derived for calculating the magnetic field is correct.

Table 1.

| | | | | | | |
|---|---|---|---|---|---|---|
| Experimental magnetic field strength along the $z_1$-axis | | | | | | |
| Position (cm) | −5.5 | −3.3 | −1.5 | −0.7 | −0.3 | 0 |
| Strength (Gauss) | 27 | 10 | 3.9 | 1.4 | 0.6 | 0 |
| Position (cm) | 0.5 | 1.4 | 2.6 | 3.6 | 3.9 | 5.5 |
| Strength (Gauss) | 0.2 | 0.4 | 3.7 | 8.0 | 9.7 | 26 |

Table 2.

| | | | | | | |
|---|---|---|---|---|---|---|
| Calculated magnetic field strength along the $z_1$-axis | | | | | | |
| Position (cm) | −6.5 | −5.85 | −5.2 | −4.55 | −3.9 | 8.5 |
| Strength (Gauss) | 27.3 | 28.4 | 24.1 | 18.2 | 12.99 | 8.5 |
| Position (cm) | −2.6 | −1.95 | −1.3 | −0.65 | 0 | 0.65 |
| Strength (Gauss) | 5.6 | 3.13 | 1.4 | 0.32 | 0 | 0.32 |

Table 3.

| | | | | | | |
|---|---|---|---|---|---|---|
| Experimental magnetic strength along the $x_1$-axis | | | | | | |
| Position (cm) | −6 | −5 | −4 | −3 | −2 | −1 | 0 |
| Strength (Gauss) | 6.8 | 8.5 | 6.3 | 3.7 | 1.95 | 0.5 | 0.12 |
| Position (cm) | 1 | 2 | 3 | 4 | 5 | 6 | |
| Strength (Gauss) | 0.66 | 1.5 | 3.5 | 6.4 | 8.0 | 6.6 | |

Table 4.

| | | | | | | | |
|---|---|---|---|---|---|---|---|
| Calculated magnetic strength along the $x_1$-axis | | | | | | | |
| Position (cm) | −6.5 | −5.85 | −5.2 | −4.55 | −3.9 | −3.25 | −2.6 |
| Strength (Gauss) | 3.03 | 7.6 | 12.1 | 12.8 | 11.0 | 8.22 | 5.5 |
| Position (cm) | −1.95 | −1.3 | −0.65 | 0 | 0.65 | 1.3 | 1.95 |

Table 4.-continued

| | | | | | | | |
|---|---|---|---|---|---|---|---|
| Calculated magnetic strength along the $x_1$-axis | | | | | | | |
| Strength (Gauss) | 3.2 | 1.5 | 0.44 | 0 | 0.14 | 0.96 | 2.37 |
| Position (Gauss) | 2.6 | 3.25 | 3.9 | 4.55 | 5.2 | 5.85 | 6.5 |
| Strength (Gauss) | 4.4 | 6.96 | 9.7 | 11.8 | 11.6 | 8.0 | 2.64 |

FIGS. 7 and 8 clearly show the mirror characteristics of the magnetic well. Furthermore, FIG. 5 shows the cusped geometry and the three-dimentional confining ability of this magnetic well.

As previously discussed, this magnetic well has the advantages of a cusped geometry magnetic well but it has a more nearly spherical symmetry than the conventional ones and has a three-dimensional confining ability. These characteristics make this type of magnetic well very well suited for confining a plasma.

The gradient of the field is quite large in the outer regions of the well and decreases toward the center. This characteristic indicates that the magnetic "pressure" increases sharply in the direction away from the center. In turn, this enhances the plasma confinement because of the continuously increased pressure exerted on the plasma, should it move away from the center of the well. Furthermore, there is no charge separation to cause instability. This is a favorable characteristic of the present magnetic well.

With the present invention, it is appreciated that there is a possibility that charged particles may be lost from the poles (end losses). That is, a particle may escape from the well if it travels toward the pole positions at a certain angle with a certain energy. This loss may be overcome by the structure shown in FIG. 10 wherein the magnetic well is formed by current loops placed on planes corresponding to the facets of a regular octahedron with the magnetic fields of each coil of an opposing pair of coils being arranged to reinforce each other, thus providing a magnetic well with tetrahedral symmetry, the tetrahedron of symmetry for the field being denoted 50 in FIG. 10.

Figure 10:
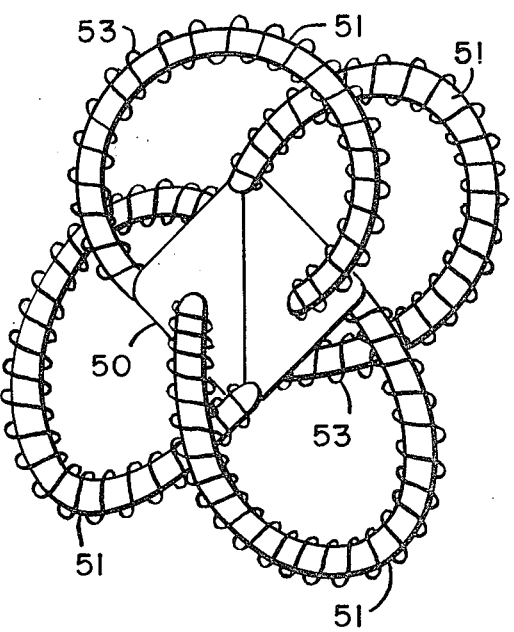
FIG. 10 is a diagrammatic illustration of a system for minimizing end losses for the system of FIGS. 3 and 4.

The apexes of the tetrahedron 50 shown in FIG. 10 are the positions that a particle may travel through and then escape from the magnetic well. In addition, there are the center locations of each facet of the tetrahedron. These eight positions correspond to the eight centers of the eight current loops used for producing the magnetic field. Four confining tubes 51 each extend between one of the apexes of the tetrahedron 50 and the center of the opposing facet. Thus, each tube connects two of the opposite poles. Each tube is provided with suitable current-carrying windings (53) to generate a magnetic field about the axis of the tube such as to cause particles lost from one pole to migrate through the tube to an opposite pole of the well.

In general, it is preferred that the structures discussed be as close as possible to the ideal, as expressed by the geometrical concepts used in disclosing the invention. However, persons skilled in the art will appreciate, for example, that the polyhedral shapes may be varied to some extent from the regular shapes discussed, the loops may be less than true circles, and the symmetry of the magnetic flux surface may be slightly irregular while continuing to practice the principle of the invention. All such modifications and substitutions are intended to be covered as they are embraced within the spirit and scope of the appended claims.

We claim:

1. Apparatus for forming a magnetic well for plasma confinement comprising a plurality of at least four current-carrying loops arranged such that each loop lies in a plane corresponding generally to one facet of a substantially regular polyhedron, the magnitude and direction of current flow in said loops being such as to minimize the magnetic field at the center of said polyhedron when all current loops are energized.

2. The apparatus of claim 1 characterized in that the magnetic flux surface of the field has a three-dimensional cusped geometry with near spherical symmetry.

3. The apparatus of claim 1 characterized in that the magnetic field increases continuously in all radial directions from said center to maximum values inside said current loops.

4. The apparatus of claim 1 further comprising means forming a vacuum chamber for containing said plasma.

5. The apparatus of claim 1 wherein there are only four current-carrying loops arranged in the general shape of a regular tetrahedron.

6. The apparatus of claim 1 wherein there are six current-carrying loops arranged in the general shape of a cube.

7. The apparatus of claim 1 wherein there are eight current-carrying loops arranged in the general shape of a regular octahedron.

8. The apparatus of claim 1 wherein there are 12 current-carrying loops arranged in the general shape of a duodecahedron.

9. The apparatus of claim 1 wherein there are 20 current-carrying loops arranged in the general shape of a regular icosahedron.

10. The apparatus of claim 1 wherein each of said current-carrying loops is formed in the general shape of a circle and the diameters of all of said circles formed by said loops are approximtely equal.

11. The apparatus of claim 1 wherein there are eight current loops formed in the general shape of a regular octahedron and defining four pairs of opposing loops, the magnetic field generated by each loop of a given pair reinforcing the field generated by the complementary loop of that pair, the magnetic fields of all of said opposing pairs of loops being arranged to minimize the magnetic field intensity at the center of said octahedron, thereby to generate a magnetic field of tetrahedral symmetry.

12. The apparatus of claim 1 further comprising a plurality of magnetic confinement means each providing with energized helical coil means, and extending between a pair of opposite magnetic poles generated by said loops for minimizing end loss from said loops.

13. Apparatus comprising: a source of ions, means forming a vacuum chamber, means for introducing said ions into said chamber, and a plurality of at least four generally circular closed current conductors spaced about said chamber substantially the symmetry of a regular polyhedron, each of said conductors being energized with electrical current flowing in respective directions in each loop to minimize the magnetic field in the center of the polyhedron.

14. The apparatus of claim 13 wherein there are eight current conductors spaced about said chamber in the symmetry of a regular octahedron.

15. The apparatus of claim 14 wherein said conductors are arranged in opposing pairs, the current in each conductor of an opposing pair flowing in the same direction to generate reinforcing magnetic fields, the magnetic well having a tetrahedral symmetry, and being characterized in that the magnetic field of the field increases continuously in all radial directions from the center to maximum values inside said conductors.

16. The apparatus of claim 15 further comprising four toroidal confining tubes, each communicating with said chamber at opposite magnetic poles for each opposing pair of conductors; and magnetic winding means extending along each of said tubes for creating a magnetic field within each tube for directing charged particles along the respective axes of each tube, in a stable manner, whereby any particles lost through a magnetic pole will be routed to an opposite magnetic pole by means of one of said tubes and the magnetic field created by the associated winding means thereon.

* * * * *